United States Patent [19]
Tamamura et al.

[11] Patent Number: 5,815,752
[45] Date of Patent: Sep. 29, 1998

[54] CAMERA HAVING A MAGNETIC RECORDING APPARATUS SELECTIVELY OPERABLE BASED ON FILM FEED SPEED

[75] Inventors: Hideo Tamamura, Yokohama; Chikara Aoshima, Zama, both of Japan

[73] Assignee: Canon Kabushiki Kaisha, Tokyo, Japan

[21] Appl. No.: 342,010

[22] Filed: Nov. 16, 1994

Related U.S. Application Data

[63] Continuation of Ser. No. 281,119, Jul. 28, 1994, abandoned, which is a continuation of Ser. No. 758,611, Sep. 12, 1991, abandoned.

[30] Foreign Application Priority Data

Sep. 13, 1990 [JP] Japan ................................ 2-243625
Nov. 7, 1990 [JP] Japan ................................ 2-299821

[51] Int. Cl.$^6$ .................................................. G03B 17/24
[52] U.S. Cl. ........................... 396/319; 396/395; 396/406
[58] Field of Search ............................ 354/76, 105, 106, 354/173.1, 173.11, 484; 396/310, 319, 387, 395, 406, 281, 287, 301

[56] References Cited

U.S. PATENT DOCUMENTS

| | | | |
|---|---|---|---|
| 4,269,489 | 5/1981 | Takimoto | 354/268 X |
| 4,538,893 | 9/1985 | Nakano et al. | 354/173.1 X |
| 4,679,925 | 7/1987 | Kawamura et al. | 354/173.1 |
| 4,841,319 | 6/1989 | Hansen | 354/275 |
| 4,878,075 | 10/1989 | Cannon | 354/173.1 |
| 4,887,118 | 12/1989 | Gaewsky | 354/173.1 X |
| 4,963,985 | 10/1990 | Isoguchi et al. | 358/909 X |
| 4,972,223 | 11/1990 | Kaneko et al. | 354/443 |
| 4,977,419 | 12/1990 | Wash et al. | 354/76 |
| 5,184,161 | 2/1993 | Egawa | 354/105 |

FOREIGN PATENT DOCUMENTS

| | | |
|---|---|---|
| 55-88044 | 7/1980 | Japan . |
| 2-56783 | 2/1990 | Japan . |

*Primary Examiner*—Safet Metjahic
*Assistant Examiner*—J. K. Han
*Attorney, Agent, or Firm*—Fitzpatrick, Cella, Harper & Scinto

[57] ABSTRACT

A camera provided with a magnetic head for effecting at least one of writing information into a magnetic portion of a film and reading information from the magnetic portion. The camera includes a detection circuit for detecting a feed speed of the film and a prohibiting circuit for prohibiting a photographing operation of the camera when the feed speed of the film detected by the detection circuit is lower than a predetermined speed.

16 Claims, 12 Drawing Sheets

CAMERA HAVING A MAGNETIC RECORDING APPARATUS SELECTIVELY OPERABLE BASED ON FILM FEED SPEED

This application is a continuation, of application Ser. No. 08/281,119, filed Jul. 28, 1994, which is a continuation of application Ser. No. 07/758,611, filed Sep. 12, 1991, both now abandoned.

BACKGROUND OF THE INVENTION

1. Field of the Invention

This invention relates to a camera using film with a magnetic memorizing portion and provided with a magnetic head for writing and reading information on the magnetic memorizing portion of the film.

2. Related Background Art

In recent years, for the reasons that the work of setting the leading end portion of film protruded from a film cartridge onto a spool or the like is cumbersome and that the leading end portion of the film is inadvertently pulled out, whereby the film is exposed to make that portion of the film unusable, there has been proposed a film cartridge of the type which uses a cartridge housing containing the entire film therein (containing even the leading end portion of the film therein) and in which the cartridge housing is inserted, for example, from a side of a camera into a cartridge chamber and the film is forced out of the housing by a fork driving operation (U.S. Pat. No. 4,841,319, for example.)

There has also been proposed a film cartridge of the type which uses film having a magnetic memory portion and in which information such as shutter time, aperture value and title is written onto and read from the magnetic memory portion by a magnetic head (U.S. Pat. No. 4,977,419).

So, an attempt to realize a camera of the so-called pre-wind type in which the film contained in the cartridge housing as previously described is the type of film having a magnetic memory portion and which uses such a cartridge housing and also has a magnetic head disposed in the camera body and in which all the film is first wound up (taken up onto a film take-up spool) and the film is rewound into the cartridge housing each time photographing is effected encounters the following problems:

1) If the magnetic head for writing and reading is simply disposed in contact with the surface of the film, when the leading end portion of the film is forced out of the cartridge housing and directed into a spool chamber, it will collide with the magnetic head (or a film keeping pad) to thereby bend the film or make auto-loading impossible.

2) Likewise, if during auto-loading, the magnetic head is kept in contact with the film until predetermined information is read by the camera and still thereafter, until all of the film is taken up onto a film take-up spool, dust adhering to the film will firmly adhere to the magnetic head to deteriorate the performance of the magnetic head.

3) If the film and the magnetic head are kept in contact with each other, the load of film winding will increase and therefore, a long time will be required before the film is all taken up, and thus, the photographer will lose the snapshot ability during that time and the consumption of a battery will be quickened with an increase in the load.

4) When the photographer is carrying a camera with him, for example, when the photographer is walking with the camera hanging from his neck, vibration will be transmitted to the camera and the magnetic head may move to injure the delicate magnetic memory portion of the film or otherwise cause various accidents.

In view of the above-noted points, the applicants have previously proposed a camera of a construction in which the magnetic head is retracted from the surface of the film except during the writing or reading of information on the magnetic memorizing portion of the film. Thereby, it has become possible to solve the above-noted problems.

In the camera as described above, however, unlike conventional cameras, it is unavoidable that the use of the magnetic head results in more consumption of electric power. Also, to read information from the magnetic memory portion by the magnetic head, it is necessary to feed the film at a high speed exceeding a predetermined level. This is because a variation in the magnetic field is picked up by the magnetic head and therefore, if the film advances slowly, the response of the output will become bad and the output waveform will become dull. Consequently, if a change in temperature or the like is also experienced, the camera will unavoidably have to be operated at a much higher voltage than before to ensure that the writing and reading of information to is reliably accomplished by the magnetic head. This means a decrease in the number of rolls of film capable of photographing, and when the photographer forgets to carry a spare battery with him, there will arise the inconvenience that the photographing becomes impossible earlier than expected for conventional cameras. Particularly, it is in the middle of film feeding that the magnetic head is driven and therefore, the number of rolls of film capable of being fed following a voltage drop will decrease more greatly than in a conventional camera.

Also, U.S. Pat. No. 4,878,075 proposes the following camera.

When design is made such that after the termination of photographing (exposure), information indicating that a particular frame has been exposed, for example, the term "exposed", is written into a magnetic memorizing portion corresponding to each frame of film by a magnetic head and the film is rewound into a film cartridge and that film cartridge is again inserted into the camera for use, whether the frame is an exposed frame or an unexposed frame is detected by whether the information "exposed" is written into the magnetic memorizing portion, and if the frame is an unexposed frame, that unexposed frame is set to the aperture position so that photographing using that unexposed frame may become possible.

Also, in the same U.S. Pat. No. 4,878,075, it is proposed that film information such as ISO information and the number of film frames prewritten on the film is read out by the magnetic head and on the basis thereof, various kinds of control of the camera are effected automatically.

However, an attempt to realize a camera endowed with both of the functions proposed by the aforementioned U.S. Pat. No. 4,977,419 and the function proposed by the aforementioned U.S. Pat. No. 4,878,075 would encounter the following problem.

The read-out output of the magnetic head becomes greater in proportion to the speed of the film and therefore, if the film feeding speed becomes low by some reason or other, for example, by the drop of the source voltage of the camera or an increase in the film feeding load, the read-out output of the magnetic head will become small or unstable when the magnetic head reads the magnetic information written in the film. This would lead to the possibility that the camera malfunctions, for example, the detection (setting) of an unexposed frame becomes impossible, with the result that a frame is subjected to double exposure or the ISO information of the film is wrongly input and proper exposure is not obtained.

SUMMARY OF THE INVENTION

One aspect of the application is to provide a camera in which the writing or reading of data into or from a magnetic memorizing portion provided on film is effected and in which the photographing operation is performed without executing a writing or reading operation in a situation where writing or reading cannot be executed properly.

One aspect of the application is to provide, under the above object, a camera in which the writing or reading of data is permitted when the source voltage of the camera is higher than a predetermined level and in which writing or reading is prohibited when the source voltage is lower than the predetermined level.

One aspect of the application is to provide, under the above objects, a camera in which during photographing when the reading of data is prohibited, film information is forcibly set to a commonly used value or a value manually set by an operating member and the photographing operation is performed by the use of this set value.

One aspect of the application is to provide, under the above objects, a camera in which, in a situation in which the feeding speed of the film is unsuited for the writing or reading of data, the photographing operation is prohibited or the photographing operation is performed without a writing or reading operation being executed.

Other objects of the present invention will become apparent from the following detailed description of some embodiments of the invention taken in conjunction with the accompanying drawings.

DESCRIPTION OF THE PREFERRED EMBODIMENTS

Figure 1:
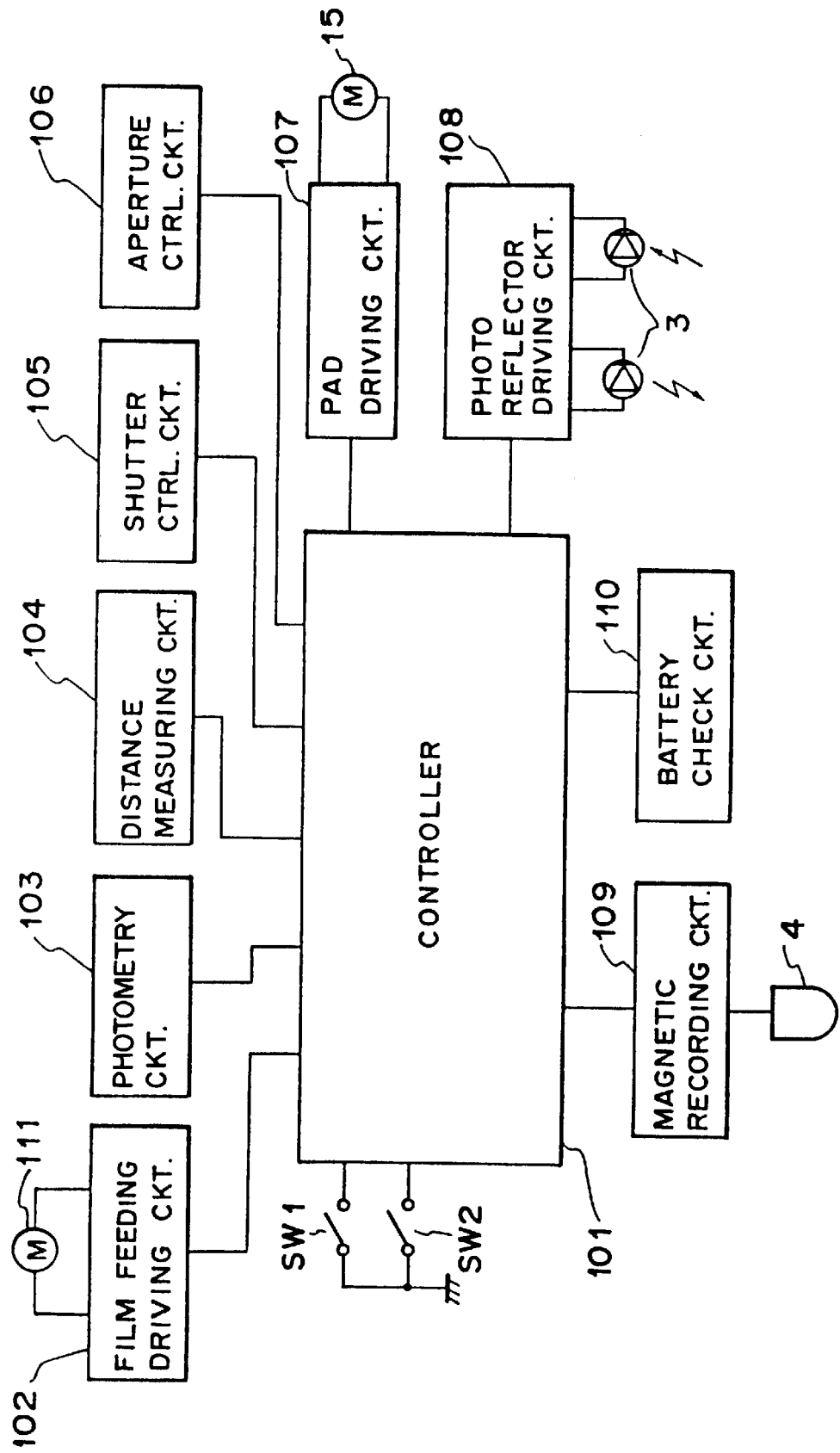
FIG. 1 is a block diagram showing an embodiment of the present invention.

The present invention will hereinafter be described in detail with respect to some embodiments thereof shown in the drawings.

Figure 2:
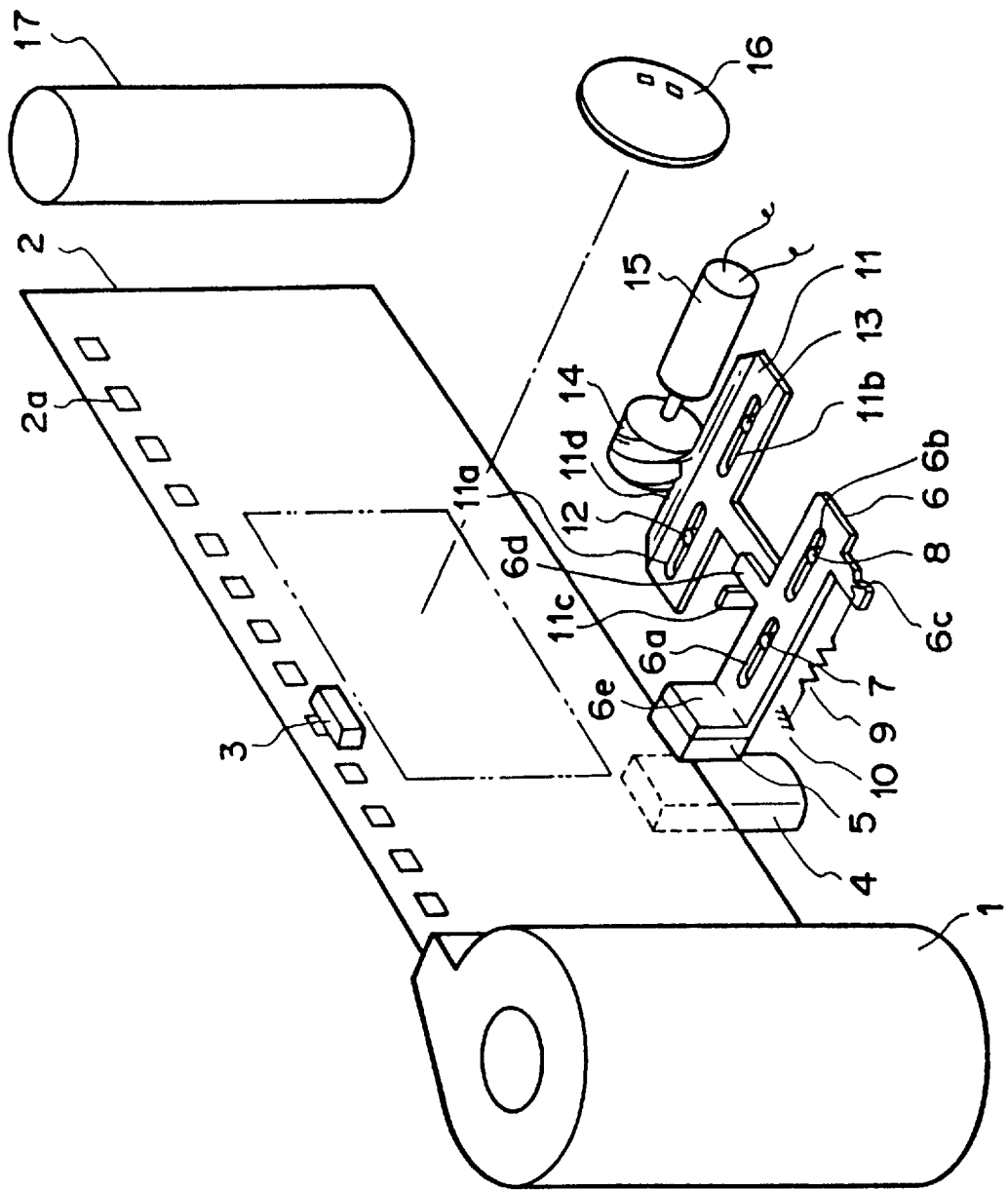
FIG. 2 is a perspective view showing the construction of portions of the FIG. 1 embodiment.

FIG. 2 is a perspective view showing the construction of portions of a camera according to an embodiment of the present invention. In FIG. 2, the reference numeral 1 designates a cartridge housing containing therein all of film 2 (until immediately before the auto-loading is started) provided with a magnetic memorizing portion (not shown) and perforations 2a. The cartridge housing 1 is inserted into a cartridge chamber, not shown. The reference numeral 3 denotes a photo reflector disposed at the passage position of the perforations 2a of the film 2 for detecting a feed state of the film, and the reference numeral 4 designates a magnetic head for reading information (for example, ISO information, the information of the number of film frames, etc.) written on the magnetic memorizing portion of the film 2, and writing information into the magnetic memorizing portion. The magnetic head 4 is secured to a pressure plate, not shown, or the like. The reference numeral 5 denotes a film keeping pad formed of an elastic material such as rubber. The surface of the pad 5 which contacts with the film 2 is made smooth and slippery to the utmost. The reference numeral 6 designates a lever having a rising portion 6e for holding the film keeping pad 5, slot portions 6a and 6b slidably fitted on pins 7 and 8, respectively, provided on the body side, and protruded portions 6c and 6d. A spring 9 having one end thereof attached to a structural member 10 on the body side is secured to the protruded portion 6c, and is normally biased toward the surface of the film 2.

The reference numeral 11 denotes a lever having slot portions 11a and 11b slidably fitted on pins 12 and 13, respectively, provided on the camera body side, a protruded portion 11c against which the protruded portion 6d of the lever 6 bears, and a rack portion 11d meshing with a worm gear 14 which will be described later, and the reference numeral 14 designates a worm gear secured to the output shaft of a motor 15 for transmitting the output of the motor to the lever 11. The film keeping pad 5 is moved toward the surface of the film 2 by the forward rotation of the motor 15 through the levers 11 and 6. The reference numeral 16 denotes a photo-taking lens, and the reference numeral 17 designates a film take-up spool.

Referring now to FIG. 1 which is a circuit block diagram of the present embodiment, the reference numeral 101 designates a control circuit comprised of a microcomputer which governs the control of the entire camera, the reference numeral 102 denotes a film feeding driving circuit for driving a feeding motor for effecting the winding and rewinding of the film, the reference numeral 103 designates a photometry circuit, the reference numeral 104 denotes a distance measuring circuit, the reference numeral 105 designates a shutter control circuit, the reference numeral 106 denotes an aperture control circuit, the reference numeral 107 designates a pad driving circuit for controlling the driving of the motor 15 and moving the film keeping pad 5 toward and away from the surface of the film 2 through the levers 11 and 6, the reference numeral 108 denotes a photo reflector driving circuit for driving the photo reflector 3 and counting the number of perforations 2a from the photo reflector 3, and the reference numeral 109 designates a magnetic recording circuit for effecting the control of the magnetic head 4.

The reference numeral 110 denotes a battery check circuit for checking the state of a battery which is the power source of the camera. The battery check circuit 110 has the function of performing battery check 1 which compares a first predetermined voltage which is a threshold value level enabling photographing in which the magnetic head 4 is driven with the source voltage, and battery check 2 which compares a second predetermined voltage (<the first predetermined voltage) which is a threshold value level enabling photographing by prohibiting the driving of the magnetic head 4 with the source voltage.

The operation when "OK" is output in the battery check 1 effected by the battery check circuit 110 will now be described with reference to the flow chart of FIG. 3.

"Step 201" When the cartridge housing 1 is mounted into a cartridge chamber, not shown, and the lid of the camera is closed, the film feeding driving circuit 102 and the feeding motor 111 are driven and the film 2 is forced out of the cartridge housing 1, and the take-up of the film onto the spool 17 is started. That is, the conventional auto-loading (AL) operation is started. At this time, the film keeping pad 5 is in its retracted position and consequently, the surface of the forced-out film 2 and the magnetic head 4 do not contact with each other.

"Step 202" The photo reflector 3 is driven by the photo reflector driving circuit 108.

"Step 203" The photo reflector driving circuit 108 counts ON and OFF signals sent thereto from the photo reflector 3. That is, the detection of the number of frames of the film 2 is started.

"Step 204" At a point of time whereat a predetermined number of frames has been counted by the photo reflector driving circuit 108, that is, the film 2 has wound around the film take-up spool 17, the motor 15 is driven (rotated in the forward direction) for a predetermined time through the pad driving circuit 107.

By the motor 15 being rotated in the forward direction, the lever 11 is moved toward the surface of the film 2 through the worm gear 14 shown in FIG. 2, and along therewith, the position regulation by the protruded portion 11c of the lever 11 is released and therefore, the lever 6 is also moved toward the surface of the film 2 in accordance with the biasing of the spring 9 and soon, the film keeping pad 5 secured to the rising portion 6e urges the surface of the film 2 against the magnetic head 4. The movement stroke of the lever 11 at this time is designed to be greater than the movement stroke of the lever 6. Of course, this is for the purpose of ensuring that the film keeping pad 5 urges the surface of the film 2 against the magnetic head 4.

"Step 205" The magnetic head 4 is driven by the magnetic recording circuit 109.

"Step 206" The reading of the information written in the magnetic memorizing portion of the film 2 is effected N times.

"Step 207" Whether the information thus read N times has been the same in substance is discriminated, and if the information has been the same, advance is made to a step 208.

"Step 208" At this step, the driving of the magnetic head 4 is stopped through the magnetic recording circuit 109 to stop the reading of information.

"Step 209" The motor 15 is driven for a predetermined time by the pad driving circuit 107 (in this case, the motor is electrically energized in the direction opposite to the direction at the step 204 and rotated in the reverse direction).

By the motor 15 being rotated in the reverse direction, the lever 11 is moved away from the surface of the film 2 through the worm gear 14 shown in FIG. 2, and along therewith, the lever 6 has its protruded portion 6d pushed by the protruded portion 11c of the lever 11 and therefore begins to move in the same direction against the biasing force of the spring 9 and soon, the film keeping pad 5 retracts from the surface of the film 2.

"Step 210" When a prescribed number of frames is detected by the photo reflector driving circuit 108 which is detecting the film feeding state, that is, when, for example, the information of the number of film frames read from the surface of the film 2 by the magnetic head 4 is "36 frames", when "the number of perforations corresponding to 36 frames plus the number of perforations corresponding to the predetermined number of frames" is counted by the photo reflector driving circuit 108, the driving of the feeding motor 111 is stopped through the film feeding driving circuit 102.

"Step 211" The feeding motor 111 is driven in the opposite direction by the film feeding driving circuit 102 by the number of perforations corresponding to the predetermined number of frames wound too much, and when this operation is terminated, the driving of the feeding motor 111 is stopped again. In this state, the 36th frame of the film 2 is reliably located at the aperture position. That is, so-called pre-winding is terminated and the setting of the first photographing frame at the aperture position is terminated.

"Step 212" At this step, whether a switch $SW_1$ adapted to be closed by the first stroke of a release button has been closed is examined, and if this switch is closed, advance is made to a step 213.

"Step 213" Since the switch $SW_1$ is closed, the photometry circuit 103 and the distance measuring circuit 104 are driven, whereby photometry information and distance measuring information are obtained.

"Step 214" At this step, whether a release switch $SW_2$ adapted to be closed by the second stroke of the release button has been closed is examined, and if this switch is closed, advance is made to a step 215.

"Step 215" Since the release switch $SW_2$ is closed, the shutter control circuit 105 and the aperture control circuit 106 are driven to thereby effect conventional exposure control.

If neither of the switches $SW_1$ and $SW_2$ is closed, return is made to the step 212.

"Step 216" The motor 15 is driven (rotated in the forward direction), the film keeping pad 5 is moved to the surface of the film 2 and the magnetic head 4 is urged against the film by the film keeping pad 5.

"Step 217" The feeding motor 111 is rotated in the reverse direction by the film feeding driving circuit 102. That is, the rewinding of exposed frames is started.

"Step 218" Whether it has been confirmed by the photo reflector driving circuit 108 that the photo reflector 3 has detected perforations corresponding to one frame is discriminated, and at a point of time whereat it has been confirmed, the feeding motor 111 is stopped. In the middle of the rewinding of this exposed one frame, photographing information relating to said frame, for example, the date of photographing, is written into the magnetic memorizing portion of the film 2 by the magnetic head 4.

"Step 219" Since the writing of the information into the exposed frame has been terminated, the motor 15 is driven for a predetermined time through the pad driving circuit 107 to retract the film keeping pad 5 from the surface of the film 2.

"Step 220" At this step, whether the exposure of a prescribed number of frames has been terminated is examined, and if it is not terminated, return is made to the step 212, whereafter a similar operation is repeated. When the termination is confirmed thereafter, advance is made to a step 221.

"Step 221" The feeding motor 111 is rotated in the reverse direction through the film feeding driving circuit 102. That is, the leader portion of the remaining film 2 is all wound into the cartridge housing 1.

Thus, a series of operations are terminated.

The operation when "OK" is not output in battery check 1 effected by the battery check circuit 110 will now be described with reference to the flow chart of FIG. 4. It is to be understood that this camera starts the flow from the start of FIG. 4.

Figure 3:
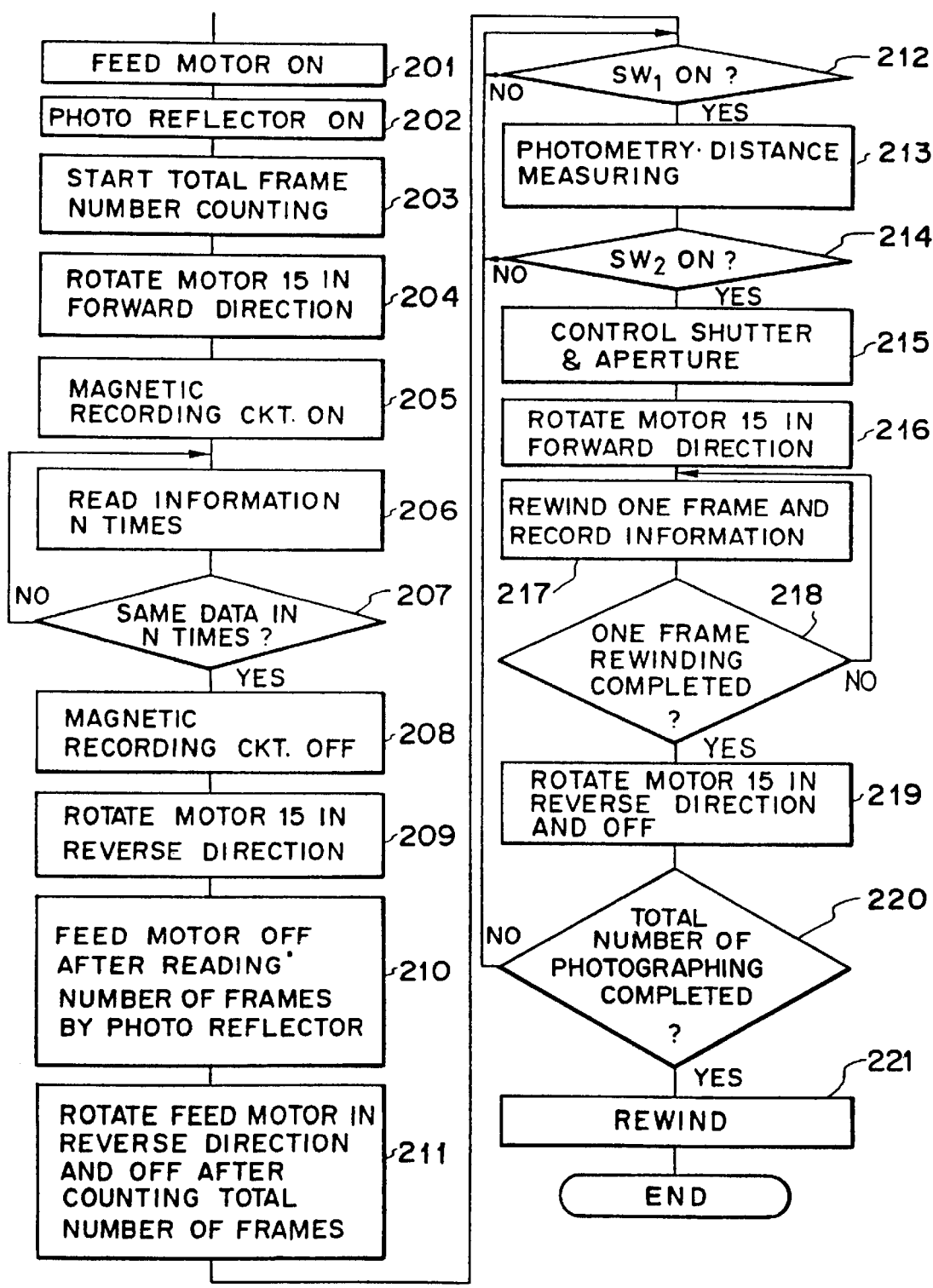
FIGS. 3 and 4 are flow charts showing the operation in an embodiment of the present invention.

"Step 301" The battery check circuit 110 is caused to effect battery check 1, and if the result of it is "OK", advance is made to the step 201 of FIG. 3, and if the result is not "OK", advance is made to a step 302.

"Step 302" The battery check circuit 110 is now caused to effect battery check 2, and if the result of it is "OK", advance is made to a step 304, and if said result is not "OK", advance is made to a step 303.

"Step 303" Since the result of battery check 2 is not "OK", that is, photographing is impossible (a state in which the fundamental operation of the camera cannot be performed) even if the magnetic head 4 is not driven, the release is locked.

"Step 304" The ISO information to be set is set. In this case, the ISO information cannot be read by the magnetic head 4 and therefore, as in the conventional cameras, information input by an ISO setting button is set. Film frame number information input by a frame number setting button is also set.

Thereafter, operations similar to the operations of the steps 201 to 203 and the steps 210 to 221 described with reference to FIG. 3 are performed. At a step 217 the writing of information is not done, but only the winding of the film by one frame is done. That is, at the step 201, the film is fed toward the spool 17 by the feeding motor, and at the steps 202 and 203, ON and OFF signals sent from the photo reflector are counted and the detection of the number of frames is effected. When at the step 210, "the number of perforations corresponding to said input frame number information plus the number of perforations corresponding to the predetermined number of frames" is detected by the counting operation, the feeding motor is stopped, and at the step 211, the feeding motor is rotated in the reverse direction to thereby set the first photographing frame at the aperture position. Thereafter, if the switches $SW_1$ and $SW_2$ are in their ON state, the photometry and distance measuring operation and the photographing operation are executed and after photographing, the film is wound by one frame and the photographing sequence is controlled. In this case, the magnetic head is controlled as its inoperative state. As the information setting at the step 304, "ISO=100" and the number of frames=24 as commonly used values may be forcibly set.

Figure 5:
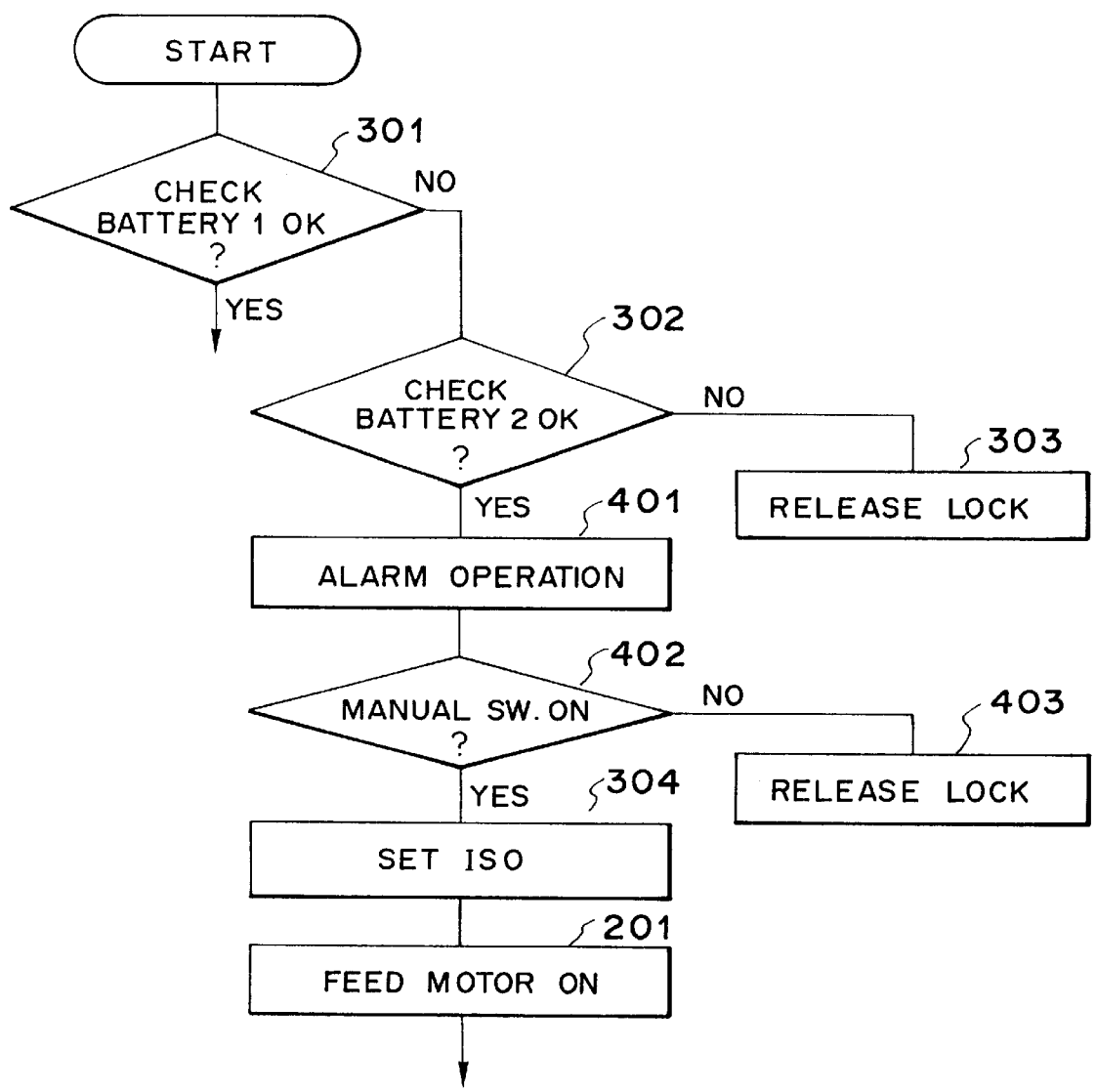
FIG. 5 is a flow chart showing the operations of portions of another embodiment of the present invention.

FIG. 5 is a flow chart showing the operations of portions in another embodiment of the present invention.

Figure 4:
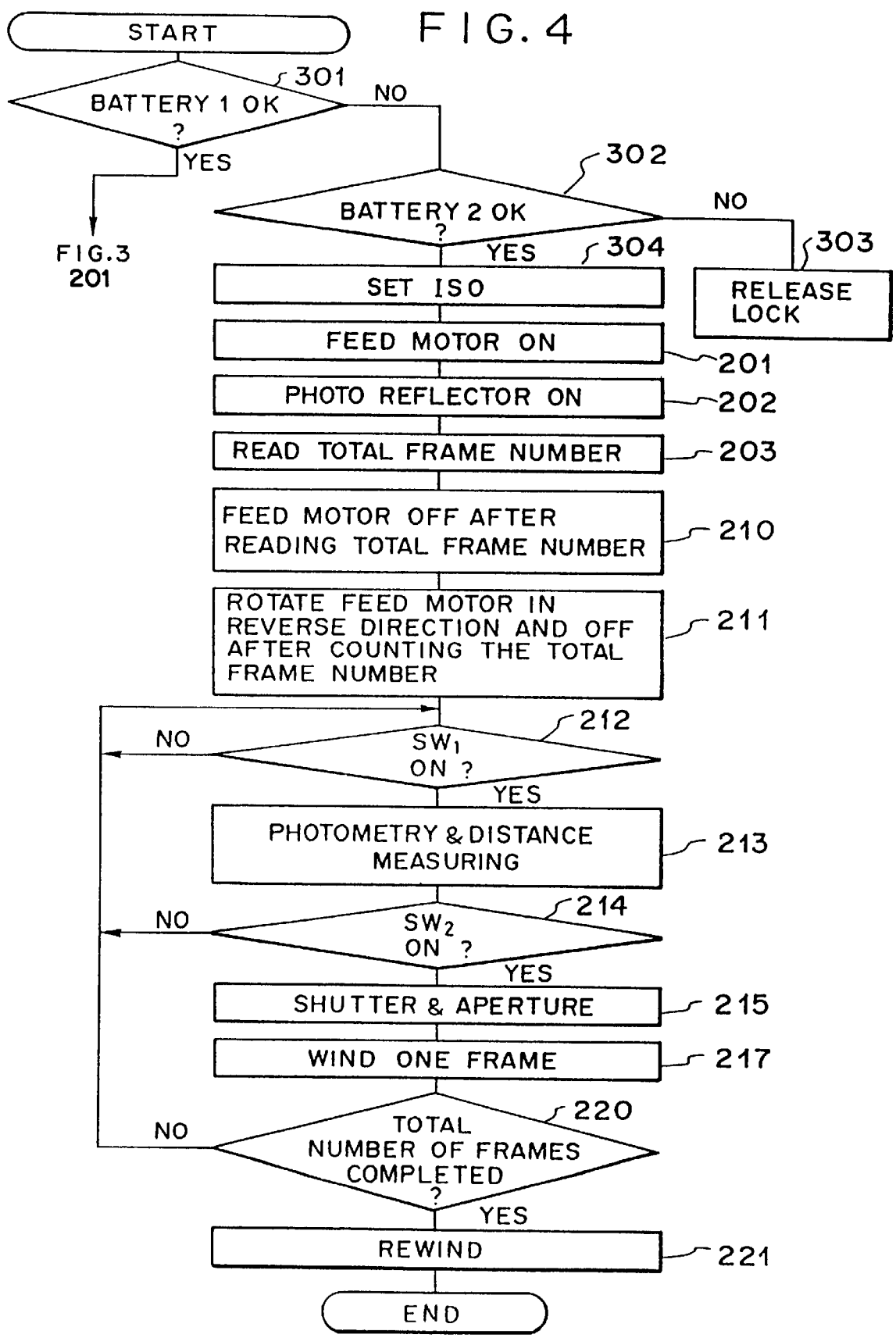

The differences of this embodiment from the embodiment of FIG. 4 are steps 401, 402 and 403. That is, at the step 401 after battery check 2, an alarm operation is performed to prevent photographing from progressing without reading and writing of information by the magnetic head 4 being effected while the photographer is not aware of it, and at the next step 402, the state of a manual switch, not shown, for setting whether photographing should progress without the reading and writing of information by the magnetic head being effected is discriminated, and if this switch is OFF, advance is made to the step 403, the release is locked, and if this switch is ON, the operations of the steps 304 and so on described with reference to FIG. 4 are executed.

Various means such as sound, LCD display, etc. are conceivable as the kinds of the alarm at the step 401.

According to the present embodiment, the design is made such that if "OK" is not output in battery check 1, battery check 2 is then effected and if as a result, "OK" is output, the driving of the head is not effected but only the fundamental operations of the camera for taking a photograph are performed and therefore, photographing will become possible even in an urgent case or in a case where there is no spare battery.

Figure 6:
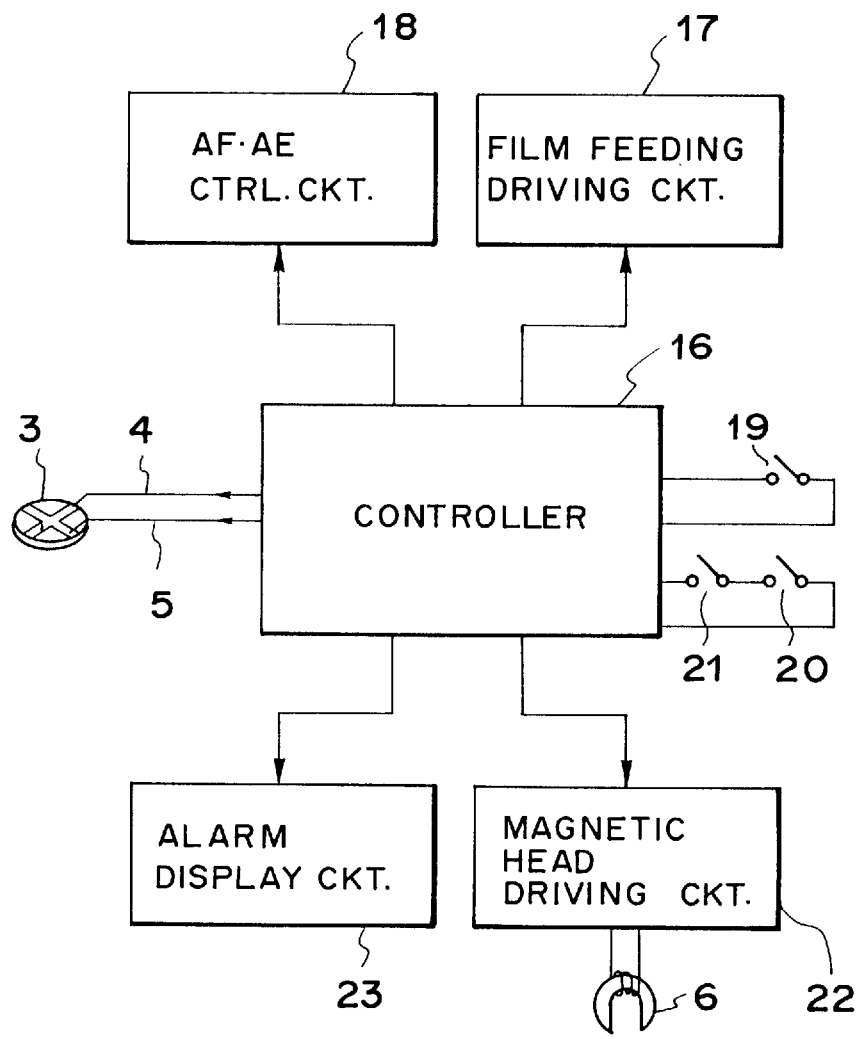
FIG. 6 is a circuit block diagram of a camera according to another embodiment of the present invention.
Figure 7:
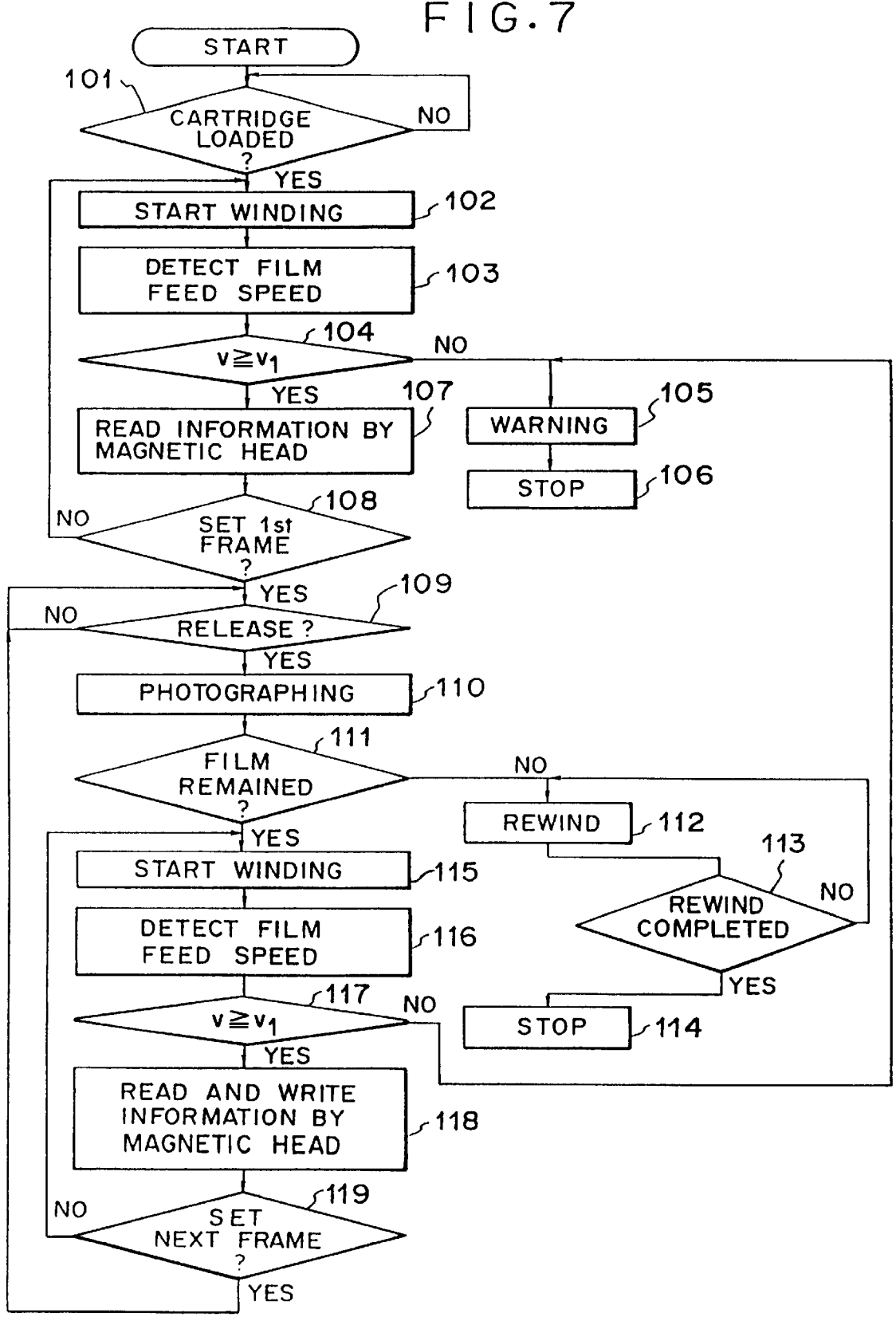
FIG. 7 is a flow chart showing the operation of the control circuit shown in FIG. 6.
Figure 8:
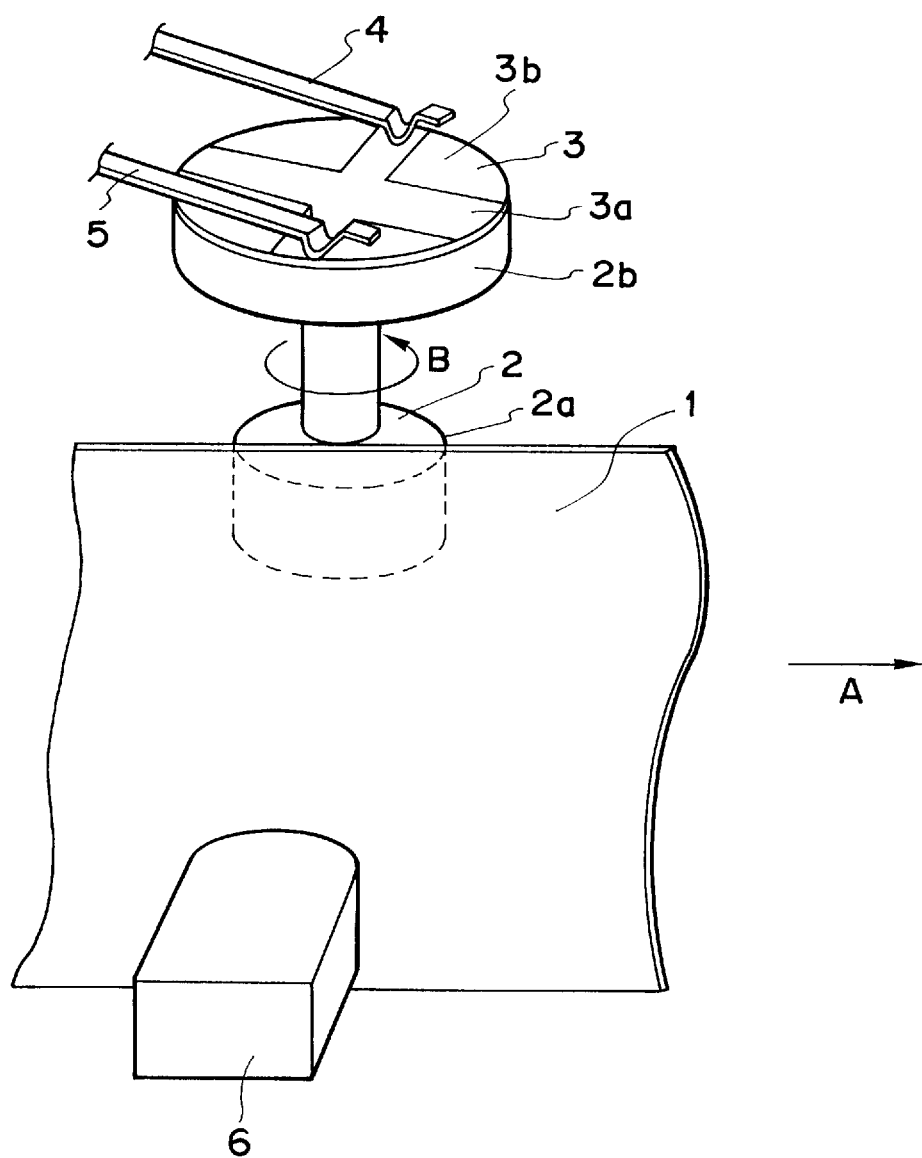
FIG. 8 is a perspective view showing an example of the film feeding mechanism in the FIG. 6 embodiment.

FIGS. 6 to 8 show another embodiment of the present invention.

Referring to FIG. 8 which shows a film feed speed detecting mechanism, the reference numeral 1 designates film provided with a magnetic memorizing portion. The film 1 is fed in the direction of arrow A or the direction opposite thereto by a conventional mechanism using a motor or the like. The reference numeral 2 denotes a roller member having a roller portion 2a for contacting with the film 1 and mounted on a camera body, not shown, so as to be rotated in the direction of arrow B by the feeding of the film 1 in the direction of arrow A. The reference numeral 3 designates a pulse substrate secured to the fixed portion 2b of the roller member 2 and rotatable with the roller member 2. The pulse substrate 3 has a conductive portion 3a and a non-conductive portion 3b. The reference numerals 4 and 5 denote contact pieces mounted on the camera body, not shown. The contact pieces 4 and 5 are rendered conductive by the conductive portion 3a of the pulse substrate 3, and the number of rotations of the pulse substrate 3 during a predetermined time is detected by the contact pieces 4 and 5, whereby the film feed speed is detected by a circuit which will be described later. The reference numeral 6 designates a magnetic head mounted on the camera body, not shown, and urged against the magnetic memorizing portion of the film 1 for reading information pre-written in the magnetic memorizing portion or newly writing information into the magnetic memorizing portion.

Various other systems such as a system for reading the perforations of the film by the use of a photointerrupter also may be used as a system for detecting the film feed speed.

FIG. 6 is a circuit block diagram of a camera provided with the film feed speed detecting mechanism as described above. In FIG. 6, the reference numeral 16 designates a control circuit comprised of a microcomputer or the like and governing various kinds of control of the camera, the reference numeral 17 denotes a film feeding driving circuit for driving a film feeding motor, not shown, the reference numeral 18 designates an AF-AE control circuit for controlling the focusing of a photo-taking lens and the operation of a shutter for exposure control, and the reference numeral 19 denotes a switch adapted to be closed by the first strike of a release button. When this switch is closed, the release of the camera is started. The reference numeral 20 designates a cartridge loading switch adapted to be closed by a film cartridge, not shown, containing the film 1 therein being loaded into the camera, and the reference numeral 21 denotes a back lid switch adapted to be closed by the back lid of the camera being closed. These switches 20 and 21 are series-connected together, and by these two switches being closed, a signal to that effect comes into the control circuit 16, which thus starts the operation of setting the first frame of the film 1 (the operation of idly feeding the film) by the inputting of the signal through the film feeding driving circuit 17 and the film feeding motor.

The reference numeral 22 designates a magnetic head driving circuit which governs the writing operation and reading operation of the magnetic head 6, and the reference numeral 23 denotes an alarm display circuit having display means using LED, sound, liquid crystal display or the like and driving the display means by a signal from the control circuit 16.

The operation of the control circuit 16 will now be described with reference to the flow chart of FIG. 7.

"Step 101" By it being detected that the film cartridge has been loaded into the camera, whereby the cartridge loading switch 20 has been closed, and the back lid of the camera has been closed whereby the back lid switch 21 has been closed, advance is made to a step 102.

"Step 102" The winding of the film is started through the film feeding driving circuit 17 and a film driving motor, not shown, so that the first frame of the film 1 may come to the aperture position of the camera.

"Step 103" From a pulse signal produced by the pulse substrate 3 and contact pieces 4 and 5 during the feeding of the film, the film feed speed v at this time is detected.

"Step 104" The above-mentioned film feed speed v is compared with a limit speed $v_1$ at which information can be stably read by the magnetic head 6, and if these speeds are in the relation that $v \geq v_1$, advance is made to a step 107, and if these speeds are in the relation that $v < v_1$, advance is made to a step 105.

"Step 105" The alarm display circuit 23 is driven to prevent the film information from being erroneously read and to prevent the camera from malfunctioning, thereby displaying to the user the alarm that normal reading of the film information is impossible.

"Step 106" A series of operations of the camera are stopped.

As previously described, if the speeds v and $v_1$ are in the relation that $v \geq v_1$, advance is made to the step 107.

"Step 107" The magnetic head driving circuit 22 is driven, and by the magnetic head 6, the film information pre-memorized in the magnetic memorizing portion of the film 1, for example, the ISO sensitivity, the number of film frames, the information "exposed", indicating that a frame has been exposed, etc. are read and memorized.

"Step 108" Whether the first frame has come to the aperture position of the camera is discriminated, and if it has not come there, return is made to the step 102, and by the first frame coming to the aperture position, the motor is stopped to discontinue the winding, and advance is made to a step 109.

"Step 109" Whether the release of the camera has been done is discriminated by the state of the switch 19, and if this switch is ON, advance is made to a step 110.

"Step 110" The AF-AE control circuit 18 is driven to thereby perform photographing operations such as the focusing of the photo-taking lens and the exposure operation by the opening-closing of the shutter suited for the ISO sensitivity read out at the step 107.

"Step 111" Whether there is a remaining frame unexposed in the film 1 is discriminated by the film information read out at the step 107, and if no unexposed frame remains, advance is made to a step 112, and if there is a remaining unexposed frame, advance is made to a step 115.

"Step 112" The rewinding of the film 1 is started through the film feeding driving circuit 17 and the film driving motor, not shown.

"Step 113" Whether the rewinding of the film 1 into the film cartridge has been completed is discriminated, and by the rewinding being completed, advance is made to a step 114.

"Step 114" A series of operations of the camera are stopped.

If there is a remaining unexposed frame in the film 1, advance is made to the step 115 as previously described.

"Step 115" The winding of the film 1 by one frame is started through the film feeding driving circuit 17 and the film driving motor, not shown.

"Step 116" From a pulse signal produced by the pulse substrate 3 and contact pieces 4 and 5 during the feeding of the film, the film feed speed v at this time is detected.

"Step 117" The film feed speed v is compared with a limit speed $v_1$ at which information can be stably read out, and if these speeds are in the relation that $v < v_1$, return is made to the already described step 105, and if the speeds are in the relation that $v \geq v_1$, advance is made to a step 118.

"Step 118" The magnetic head driving circuit 22 is driven, whereby the writing (or reading as required) of the shutter time, the information "exposed", etc. into the magnetic memorizing portion of the film 1 is effected by the magnetic head 6.

"Step 119" Whether the next frame to be exposed has come to the aperture position of the camera is discriminated, and if the frame has not come there, return is made to the step 115, and by the frame coming to the aperture position, winding is stopped and advance is made to the step 109.

Figure 9:
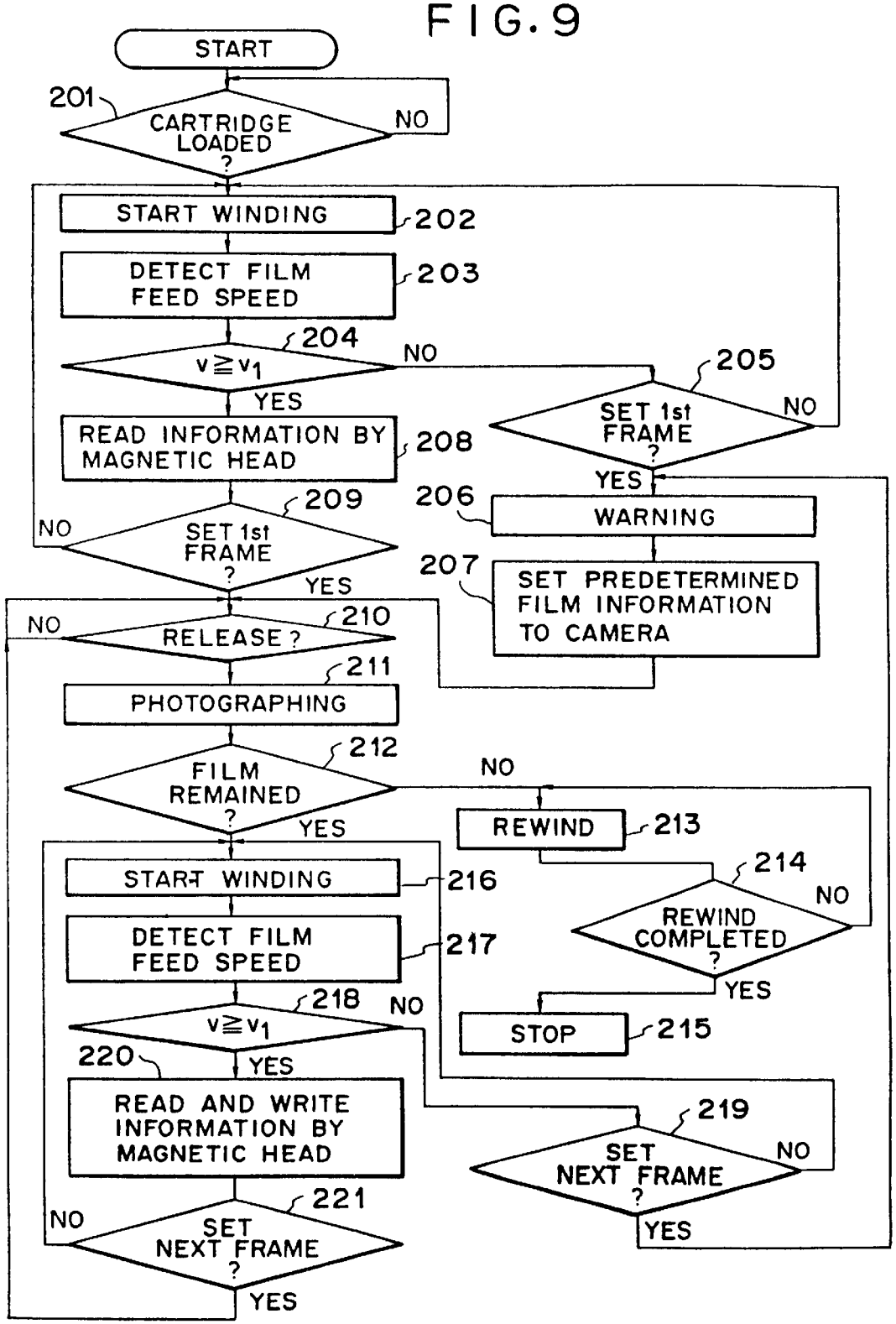
FIG. 9 is a flow chart showing the operation in another embodiment of the present invention.

FIG. 9 is a flow chart showing the operation in another embodiment of the present invention which is similar in circuit construction to the embodiment of FIG. 6 and differs in the operation of the control circuit 16 from the embodiment of FIG. 6.

"Step 201" By it being detected that a film cartridge has been loaded into the camera and the cartridge loading switch 20 has been closed and the back lid of the camera has been closed to thereby close the back lid switch 21, advance is made to a step 202.

"Step 202" The winding of the film is started through the film feeding driving circuit 17 and the film driving motor, not shown, so that the first frame of the film may come to the aperture position of the camera.

"Step 203" From a pulse signal produced by the pulse substrate 3 and contact pieces 4 and 5 during the feeding of the film, the film feed speed v at this time is detected.

"Step 204" The film feed speed v is compared with a limit speed $v_1$ at which information can be stably read by the magnetic head 6, and if these speeds are in the relation that $v \geq v_1$, advance is made to a step 208, and if these speeds are in the relation that $v < v_1$, advance is made to a step 205.

"Step 205" Whether the first frame has come to the aperture position is discriminated, and if the first frame has not come there, return is made to the step 202, and by the first frame coming to the aperture position, the winding of the film is stopped and advance is made to a step 206.

"Step 206" The alarm display circuit 23 is driven to prevent the film information from being erroneously read and prevent the camera from malfunctioning, whereby an alarm to the effect that the reading of the film information is impossible is displayed to the user.

"Step 207" The film information is set as a predetermined value in the camera.

Here, the predetermined value is a commonly used value, i.e., in terms of ISO sensitivity, "ISO=100", and in terms of the kind of the film, "negative" film, and in terms of the film frames, the value of "24" or "36".

As previously described, if the speeds v and $v_1$ are in the relation that $v \geq v_1$, advance is made to the step 208.

"Step 208" The magnetic head driving circuit 22 is driven, whereby the film information pre-memorized in the magnetic memorizing portion of the film 1, for example, the ISO sensitivity, the number of film frames, the information indicating that a frame has been exposed, "exposed", etc. are read and memorized by the magnetic head 6.

"Step 209" Whether the first frame has come to the aperture position of the camera is discriminated, and if it has not come there, return is made to the step 202, and by the first frame coming to the aperture position, the winding of the film is stopped and advance is made to a step 210.

"Step 210" Whether the release of the camera has been done is discriminated by the state of the switch 19, and if this switch is ON, advance is made to a step 211.

"Step 211" The AF-AE control circuit 18 is driven to effect photographing operations such as the focusing of the photo-taking lens and the exposure operation by the opening-closing of the shutter suited for the ISO sensitivity read out at the step 107.

"Step 212" Whether there is a remaining unexposed film frame in the film 1 is discriminated by the film information read out at the step 208 or the commonly used film information set at the step 207, and if no unexposed frame remains, advance is made to a step 213, and if there is a remaining unexposed frame, advance is made to a step 216.

"Step 213" The rewinding of the film 1 is started through the film feeding driving circuit 17 and the film driving motor, not shown.

"Step 214" Whether the rewinding of the film 1 into the film cartridge has been completed is discriminated, and by the rewinding being completed, advance is made to a step 215.

"Step 215" A series of operations of the camera are stopped.

If there is a remaining unexposed film frame in the film 1, advance is made to the step 216 as previously described.

"Step 216" The winding of the film 1 by one frame is started through the film feeding driving circuit 17 and the film driving motor, not shown.

"Step 217" From a pulse signal produced by the pulse substrate 3 and contact pieces 4 and 5 during the feeding of the film, the film feed speed v at this time is detected.

"Step 218" The film feed speed v is compared with a limit speed $v_1$ at which information can be stably read out by the magnetic head 6, and if these speeds are in the relation that $v < v_1$, advance is made to a step 219, and if these speeds are in the relation that $v \geq v_1$, advance is made to a step 220.

"Step 219" Whether the next frame to be exposed has come to the aperture position of the camera is discriminated, and if it has not come there, return is made to the step 216, and by it coming to the aperture position, the winding of the film is discontinued and return is made to the already described step 206.

"Step 220" The magnetic head driving circuit 22 is driven to thereby effect the writing (or reading as required) of the shutter time, the information that a frame has been exposed, "exposed", etc. into the magnetic memorizing portion of the film 1 by the magnetic head 6.

"Step 221" Whether the next frame to be exposed has come to the aperture position of the camera is discriminated, and if it has not come there, return is made to the step 216, and by it coming to the aperture position, the winding of the film is stopped and advance is made to the step 210.

Figure 10:
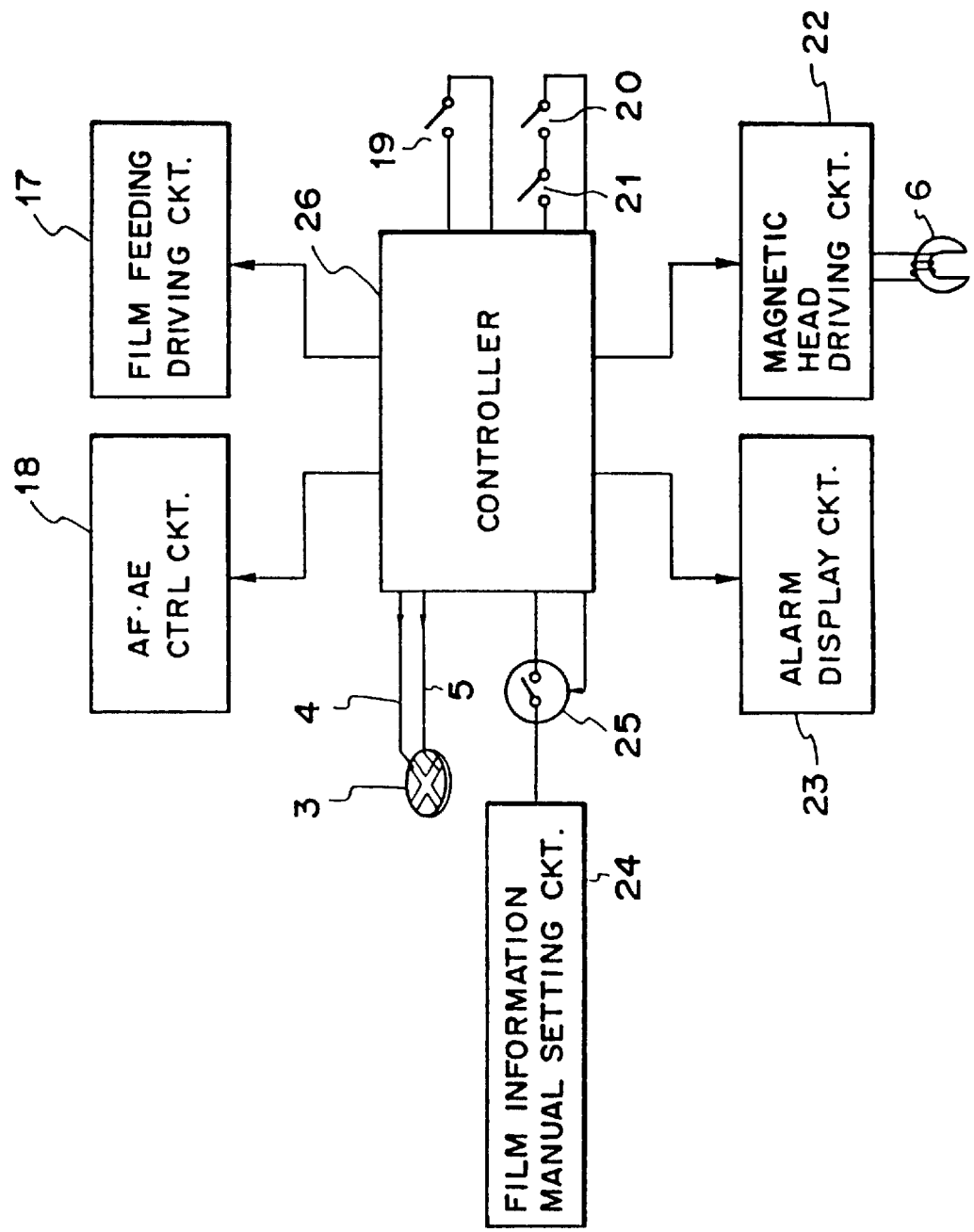
FIG. 10 is a circuit block diagram of a camera according to another embodiment of the present invention.

FIG. 10 is a circuit block diagram of a camera according to another embodiment of the present invention. In FIG. 10, the same portions as those in FIG. 6 are given the same reference numerals.

In FIG. 10, the reference numeral 24 designates a film information manual setting circuit, the reference numeral 25 denotes a changeover switch adapted to be closed and opened by a signal from the control circuit 26, and when closed, causing the information from the film information manual setting circuit 24 to be input to the control circuit 26, and the reference numeral 26 designates a control circuit which is comprised of a microcomputer or the like and governs the various operations of the camera.

Figure 11:
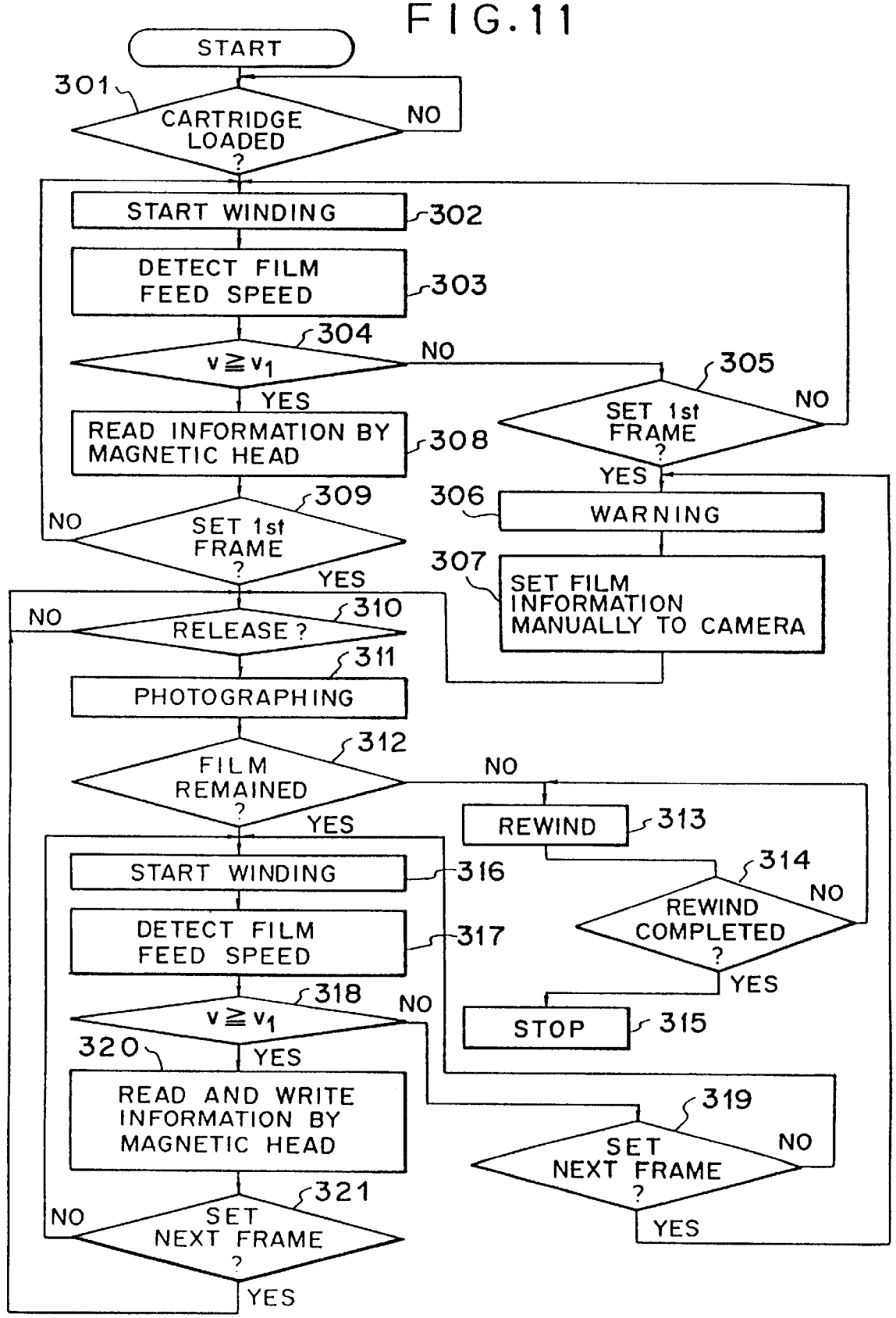
FIG. 11 is a flow chart showing the operation of the control circuit shown in FIG. 10.

The operation of the control circuit 26 will now be described with reference to a flow chart shown in FIG. 11.

"Step 301" By it being detected that a film cartridge has been loaded into the camera and the cartridge loading switch 20 has been closed and the back lid of the camera has been closed to thereby close the back lid switch 21, advance is made to a step 302.

"Step 302" The winding of the film is started through the film feeding driving circuit 17 and the film driving motor, not shown, so that the first frame of the film 1 may come to the aperture position of the camera.

"Step 303" From a pulse signal produced by the pulse substrate 3 and contact pieces 4 and 5 during the feeding of the film, the film feed speed v at this time is detected.

"Step 304" The film feed speed v is compared with a limit speed $v_1$ at which information can be stably read out by the magnetic head 6, and if these speeds are in the relation that $v < v_1$, advance is made to a step 305, and if these speeds are in the relation that $v \geq v_1$, advance is made to a step 308.

"Step 305" Whether the first frame has come to the aperture position of the camera is discriminated, and if it has not come there, return is made to the step 302, and by it coming to the aperture position, the winding of the film is stopped and advance is made to a step 306.

"Step 306" The alarm display circuit 23 is driven to prevent the film information from being erroneously read and prevent the camera from malfunctioning, whereby an alarm to the effect that the reading of the film information is impossible is displayed to the user.

"Step 307" The changeover switch 25 is closed and the film information from the film information setting circuit 24 is input. A method of manually setting the film information, for example, the ISO sensitivity, the number of film frames, etc. will be described later.

As previously described, if the speeds v and $v_1$ are in the relation that $v \geq v_1$, advance is made to the step 308.

"Step 308" The magnetic head driving circuit 22 is driven, whereby the film information pre-memorized in the magnetic memorizing portion of the film 1, for example, the ISO sensitivity, the number of film frames, the information that a frame has been exposed, "exposed", etc. are read and memorized by the magnetic head 6.

"Step 309" Whether the first frame has come to the aperture position of the camera is discriminated, and if it has not come there, return is made to the step 302, and by it coming to the aperture position, the winding of the film is stopped and advance is made to a step 310.

"Step 310" Whether the release of the camera has been done is discriminated by the state of the switch 19, and if this switch is ON, advance is made to a step 311.

"Step 311" The AF-AE control circuit 18 is driven to thereby effect photographing operations such as the focusing of the photo-taking lens and the exposure operation by the opening-closing of the shutter suited for the ISO sensitivity read out at the step 307 or 308.

"Step 312" Whether there is a remaining unexposed frame in the film 1 is discriminated by the film information read out at the step 308 or the film information manually set at the step 307, and if no unexposed frame remains, advance is made to a step 313, and if there is a remaining exposed frame, advance is made to a step 316.

"Step 313" The rewinding of the film 1 is started through the film feeding driving circuit 17 and the film driving motor, not shown.

"Step 314" Whether the rewinding of the film 1 into the film cartridge has been completed is discriminated, and by the rewinding being completed, advance is made to a step 315.

"Step 315" A series of operations of the camera are stopped.

If there is a remaining unexposed frame in the film 1, advance is made to the step 316 as previously described.

"Step 316" The winding of the film 1 by one frame is started through the film feeding driving circuit 17 and the film driving motor, not shown.

"Step 317" From a pulse signal produced by the pulse substrate 3 and contact pieces 4 and 5 during the feeding of the film, the film feed speed v at this time is detected.

"Step 318" The film feed speed v is compared with a limit speed $v_1$ at which information can be stably read out by the magnetic head 6, and if these speeds are in the relation that $v < v_1$, advance is made to a step 319, and if these speeds are in the relation that $v \geq v_1$, advance is made to a step 320.

"Step 319" Whether the next frame to be exposed has come to the aperture position of the camera is discriminated, and if it has not come there, return is made to the step 316, and by it coming to the aperture position, the winding of the film is stopped and return is made to the already described step 306.

"Step 320" The magnetic head driving circuit 22 is driven to thereby effect the writing (or reading as required) of the shutter time, the information that a frame has been exposed, "exposed", etc. into the magnetic memorizing portion of the film 1 by the magnetic head 6.

"Step 321" Whether the next frame to be exposed has come to the aperture position of the camera is discriminated, and if it has not come there, return is made to the step 316, and by it coming to the aperture position, the winding of the film is stopped and advance is made to the step 310.

The manual setting method will now be described with the inputting of the ISO sensitivity taken as an example.

Figure 12:
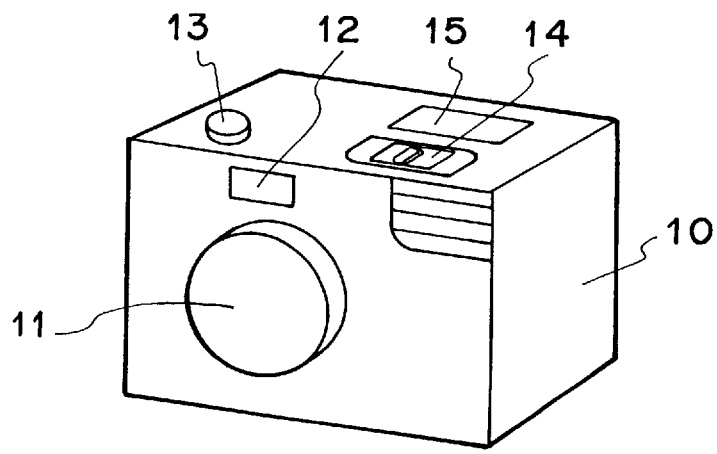
FIG. 12 is a perspective view of a camera according to the FIG. 10 embodiment.

Referring to FIG. 12 which is a perspective view of a camera, the reference numeral 10 designates a camera body, the reference numeral 11 denotes a photo-taking lens, the reference numeral 12 designates a finder, the reference numeral 13 denotes a release button, the reference numeral 14 designates a manual setting knob (which corresponds to the film information manual setting circuit of FIG. 10), and the reference numeral 15 denotes a display portion.

Figure 13:
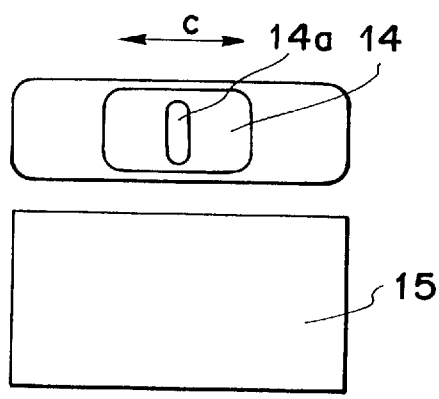
FIGS. 13 and 14 are enlarged views of the manual setting dial and the display portion, respectively, shown in FIG. 12.
Figure 14:
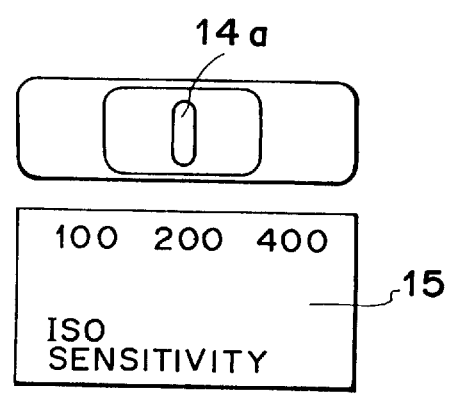

FIGS. 13 and 14 are enlarged views of the display portion 15 and the manual setting knob 14.

The manual setting knob 14 is movable in the direction of arrow C (see FIG. 13) and can be stopped at several positions by a click or the like.

Also, a switch, not shown, is closed in response to the movement of the knob 14 and the signal thereof is input to the control circuit 26 of the camera, but as already described, it is only when the speeds v and $v_1$ are in the relation that $v < v_1$, and since the changeover switch 25 is OFF when the speeds v and $v_1$ are in the relation that $v \geq v_1$, the signal is not input to the control circuit 26. Accordingly, when the speeds v and $v_1$ are in the relation that $v < v_1$, the ISO sensitivity is displayed by liquid crystal display or the like as shown in FIG. 14, and by adjusting the index 14a of the manual setting knob 14 to the ISO sensitivity of the film used, a switch, not shown, is closed and the information thereof is input to the control circuit 26.

The display portion 15 is designed such that display by liquid crystal is not effected when the speeds v and $v_1$ are in the relation that $v \geq v_1$.

According to each of the above-described embodiments, design is made such that the film feed speed is detected and if that speed is lower than a predetermined value and the reading of the film information cannot be normally effected by the magnetic head, 1) the operation of the camera is prohibited and an alarm is given, 2) an alarm is given and at the same time, the information of the film is set as a commonly used value and this is used as film information for the control of the camera, and 3) an alarm is given and at the same time, the information set manually is set as film information for the control of the camera, and therefore, the malfunctioning of the camera caused by the misreading of the film information is eliminated.

What is claimed is:

1. A camera provided with a magnetic head for effecting at least one of (i) writing information onto a magnetic portion of a film and (ii) reading information from the magnetic portion, said camera comprising:

means for feeding the film, which is contained in a cartridge;

a photographing control circuit, said circuit comprising a feeding circuit for causing said feeding means to feed the film and an exposure control circuit for controlling photographing of each frame of the film;

a magnetic control circuit for causing the magnetic head to perform at least one of a writing operation and a reading operation during film feeding; and a processing circuit, said circuit detecting an output of a power source circuit, and when the output of the power source circuit is equal to or higher than a first value, said processing circuit permitting said feeding circuit and said exposure control circuit to operate, causing said magnetic control circuit to operate when film feeding is performed by operation of said feeding circuit, and causing one of a writing operation and a reading operation to be performed, photographing of each frame being controlled by said exposure control circuit, and when the output of the power source circuit is lower than the first value, said processing circuit permitting said feeding circuit and said exposure control circuit to operate, and inhibiting said magnetic control circuit from operating, and causing the film feeding to be performed by said feeding circuit, the photographing of each frame being controlled by said exposure control circuit without at least one of the writing operation and the reading operation.

2. A camera according to claim 1, further comprising alarm means for performing an alarm operation when said magnetic control circuit is inhibited by said processing circuit.

3. A camera according to claim 1, further comprising a setting circuit for forcibly setting film information as a predetermined value in said camera, instead of using information read out from the magnetic portion, said setting circuit being operative when said processing circuit inhibits said magnetic control circuit.

4. A camera according to claim 1, further comprising a setting circuit for setting in said camera the information set by a manual setting circuit, instead of using information read out from the magnetic portion, said setting circuit being operative when said processing circuit inhibits said magnetic control circuit.

5. A camera according to claim 1, further comprising a prohibiting circuit for prohibiting the photographing operation when the output of the power source circuit is lower than a second level, the second level being lower than the first level.

6. A camera provided with a magnetic head for effecting at least one of (i) writing information onto a magnetic portion of a film and (ii) reading information from the magnetic portion, said camera comprising:

means for feeding the film, which is contained in a cartridge;

a photographing control circuit, said circuit comprising a feeding circuit for causing said feeding means to feed the film and an exposure control circuit for controlling photographing of each frame of the film;

a magnetic control circuit for causing the magnetic head to perform at least one of a writing operation and a reading operation during film feeding;

detection means for detecting a feed speed of the film; and a processing circuit, when said detection means detects that the feed speed is equal to or faster than a predetermined speed, said processing circuit permitting said feeding circuit, said exposure control circuit, and said magnetic control circuit to operate, and when the film feeding is performed by the operation of said feeding circuit, said processing circuit causing said magnetic control circuit to operate, and causing at least one of the writing operation and the reading operation to be performed, the photographing of each frame being controlled by said exposure control circuit, and when said detection means detects that the feed speed is slower than the predetermined speed, said processing circuit permitting said feeding circuit and said exposure control circuit to operate, and inhibiting said magnetic control circuit from operating, and causing the film feeding to be performed by said feeding circuit, the photographing of each frame being controlled by said exposure control circuit without at least one of the writing operation of the reading operation.

7. A camera according to claim 6, further comprising alarm means for performing an alarm operation when said processing circuit inhibits said magnetic control circuit.

8. A camera provided with a magnetic head for reading out information from a magnetic portion of a film, the operation of said camera being controlled on a basis of the read-out information, said camera comprising:

means for feeding the film, which is contained in a cartridge;

a photographing control circuit having a first mode for continuously feeding the film by a predetermined amount, and a second mode for alternately feeding one frame of the film for an exposure and after an exposure;

a magnetic control circuit for causing the magnetic head to perform at least one of a writing operation and a reading operation during the continuous film feeding in the first mode and during the one frame film feeding in the second mode;

a detection circuit for detecting a feed speed of the film; and an information circuit for setting information, instead of using the information read by the magnetic head, when the feed speed detected by said detection circuit is slower than a predetermined speed.

9. A camera according to claim 8, wherein said information circuit forcibly sets information to a predetermined value.

10. A camera according to claim 8, wherein said information circuit sets information to a manually set information value.

11. A camera according to claim 8, further comprising a control circuit for rendering the magnetic control circuit inoperative when the feed speed detected by said detection circuit is lower than a predetermined value.

12. A camera provided with a magnetic head for effecting at least one of (i) writing information onto a magnetic portion of a film and (ii) reading information from the magnetic portion, said camera comprising:

means for feeding the film, which is contained in a cartridge;

a photographing control circuit, said circuit comprising a feeding circuit for causing said feeding means to feed the film and an exposure control circuit for controlling photographing of each frame of the film;

a magnetic control circuit for causing the magnetic head to perform at least one of a writing operation and a reading operation during film feeding;

a judgment circuit for judging if a condition is suitable for the magnetic head to perform at least one of the reading operation and the writing operation; and a processing circuit, when said judgment circuit judges that execution of at least one of the reading operation and the writing operation by said magnetic head is proper, said processing circuit permitting said feeding circuit and said exposure control circuit to operate, causing said magnetic control circuit to operate when film feeding is performed by an operation of said feeding circuit, and causing at least one of the writing operation and the reading operation to be performed, the photographing of each frame being controlled by said exposure control circuit, and when said judgment circuit judges that the execution of at least one of the reading operation and the writing operation is improper, said processing circuit permitting said feeding circuit and said exposure control circuit to operate, and inhibiting the operation of said magnetic control circuit, and causing the film feeding to be performed by said feeding circuit, the photographing of each frame being controlled by said exposure control circuit without at least one of the writing operation and the reading operation.

13. A camera provided with a magnetic head for effecting at least one of (i) writing information onto a magnetic portion of a film and (ii) reading information from the magnetic portion, said camera comprising:

means for feeding a film contained in a cartridge;

a photographing control circuit, said photographing control circuit comprising a feeding circuit for causing said feeding means to feed the film and an exposure control circuit for controlling a photographing operation of each frame of the film;

a magnetic control circuit for causing the magnetic head to perform at least one of a writing operation and a reading operation during film feeding;

detection means for monitoring a feed speed of the film and detecting when the film speed is slower than a predetermined speed; and an indication circuit, responsive to a detection signal of said detection means for indicating that a proper writing operation or a proper reading operation cannot be performed, when said detection means detects that the film speed is slower than the predetermined speed.

14. A camera provided with a magnetic head for effecting at least one of (i) writing information onto a magnetic portion of a film and (ii) reading information from the magnetic portion, said camera comprising:

film feeding means for feeding a film contained in a cartridge;

a photographing control circuit, said photographic control circuit comprising a feeding circuit that causes said feeding means to feed the film and an exposure control circuit that controls a photographing operation of each frame of the film;

a magnetic control circuit that causes the magnetic head to perform at least one of a writing operation and a reading operation during film feeding;

an indication circuit which indicates that at least one of a proper writing operation and a proper reading operation cannot be performed;

a judging circuit that judges an output level of a power source circuit; and a control circuit that causes said indication circuit to operate when said judging circuit judges that the output level is lower than a first predetermined level and prohibits a photographing operation of said photographing control circuit when the output level is lower than a second predetermined level which is lower than said first predetermined level.

15. A camera provided with a magnetic head for effecting at least one of (i) writing information onto a magnetic portion of a film and (ii) reading information from the magnetic portion, said camera comprising:

film feeding means for feeding a film contained in a cartridge;

a photographing control circuit, said photographic control circuit comprising a feeding circuit that causes said feeding means to feed the film and an exposure control circuit that controls a photographing operation of each frame of the film;

a magnetic control circuit that causes the magnetic head to perform at least one of a writing operation and a reading operation during film feeding;

a judging circuit that judges a condition which influences the writing or reading operation of said magnetic head;

an indication circuit which indicates that at least one of a proper writing operation and a proper reading operation cannot be performed; and a control circuit that causes said indication circuit to perform an indication operation when said judging circuit judges that said condition is lower than a first condition level and prohibits a photographing operation performed by said photographing control circuit when said condition is lower than a second condition level which is lower than said first condition level.

16. A camera provided with a magnetic head for effecting at least one of (i) writing information onto a magnetic portion of a film and (ii) reading information from the magnetic portion, said camera comprising:

means for feeding a film contained in a cartridge;

a photographing control circuit comprising a feeding circuit that causes said feeding means to feed the film and an exposure control circuit that controls a photographing operation of each frame of the film;

a magnetic control circuit that causes the magnetic head to perform at least one of the writing operation and the reading operation during film feeding;

detection means for monitoring a feed speed of the film and determining whether the feed speed of the film is slower than a predetermined speed; and a prohibiting circuit that prohibits at least one of the writing and reading operation by said magnetic control circuit together with said magnetic head when said detection means judges that the feed speed of the film is slower than the predetermined speed.

* * * * *

UNITED STATES PATENT AND TRADEMARK OFFICE
CERTIFICATE OF CORRECTION

PATENT NO. : 5,815,752
DATED : September 29, 1998
INVENTOR(S) : HIDEO TAMAMURA, ET AL.

It is certified that error appears in the above-identified patent and that said Letters Patent is hereby corrected as shown below:

<u>Column 2</u>

Line 24, "to" should be deleted.

<u>Column 8</u>

Line 4, "step 403, the" should read --step 403, where the--.

Signed and Sealed this

Fourth Day of May, 1999

*Attest:*

*Attesting Officer*

Q. TODD DICKINSON

*Acting Commissioner of Patents and Trademarks*